United States Patent
Ziniti et al.

(10) Patent No.: US 11,474,522 B2
(45) Date of Patent: Oct. 18, 2022

(54) CONDITIONAL AND CONNECTED SMART ROUTINES FOR AUTONOMOUS VEHICLES

(71) Applicant: GM CRUISE HOLDINGS LLC, San Francisco, CA (US)

(72) Inventors: Cecilia Ziniti, Burlingame, CA (US); Divya Thakur, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 205 days.

(21) Appl. No.: 16/588,986

(22) Filed: Sep. 30, 2019

(65) Prior Publication Data

US 2021/0096567 A1    Apr. 1, 2021

(51) Int. Cl.
| | |
|---|---|
| *G05D 1/02* | (2020.01) |
| *G05D 1/00* | (2006.01) |
| *H04W 4/021* | (2018.01) |
| *G01C 21/34* | (2006.01) |

(52) U.S. Cl.
CPC ....... *G05D 1/0212* (2013.01); *G01C 21/3438* (2013.01); *G05D 1/0027* (2013.01); *G05D 1/0088* (2013.01); *H04W 4/021* (2013.01)

(58) Field of Classification Search
CPC .. G05D 1/0212; G05D 1/0027; G05D 1/0088; G01C 21/3438; G06Q 10/06; G06Q 50/30; H04W 4/021
See application file for complete search history.

(56) References Cited

U.S. PATENT DOCUMENTS

| | | | |
|---|---|---|---|
| 10,535,271 B1* | 1/2020 | Dyer | G05D 1/0088 |
| 2011/0208416 A1* | 8/2011 | Speier | G01C 21/3461 |
| | | | 701/532 |
| 2015/0149018 A1* | 5/2015 | Attard | B60W 50/14 |
| | | | 701/1 |
| 2015/0338852 A1* | 11/2015 | Ramanujam | G08G 1/202 |
| | | | 701/2 |
| 2017/0369052 A1* | 12/2017 | Nagy | B60W 30/14 |
| 2018/0060827 A1* | 3/2018 | Abbas | G06Q 10/1095 |
| 2019/0297045 A1* | 9/2019 | Orsini | G01C 21/3697 |

* cited by examiner

*Primary Examiner* — Aaron L Troost
(74) *Attorney, Agent, or Firm* — Polsinelli, PC

(57) ABSTRACT

The subject disclosure relates to techniques for implementing conditional automation systems and in particular, for facilitating conditional automation in the context autonomous vehicle (AV) transportation services. Some aspects of the disclosed technology include methods that include steps for receiving an event trigger at a conditional autonomous vehicle (AV) platform, mapping the event trigger onto a conditional output, and sending the conditional output to an autonomous vehicle (AV) associated with the event trigger, wherein the conditional output is configured to update a navigation instruction followed by the AV. Systems and machine-readable media are also provided.

20 Claims, 4 Drawing Sheets

CONDITIONAL AND CONNECTED SMART ROUTINES FOR AUTONOMOUS VEHICLES

BACKGROUND

1. Technical Field

The subject technology provides techniques for managing conditional routines and in particular, conditional outputs provided to autonomous vehicles (AVs).

2. Introduction

Autonomous vehicles (AVs) are vehicles having computers and control systems that perform driving and navigation tasks conventionally performed by a human driver. As AV technologies continue to advance, ride-hailing services will increasingly utilize AVs to improve service safety and efficiency. For effective use in ride-hailing deployments, AVs will be required to execute many service functions that are conventionally performed by human drivers.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Conditional systems have been conventionally implemented in the context of smart home automation to improve customer experience and convenience. However, conditional automation systems are lacking for transportation services (e.g., ride hailing services). Aspects of the disclosed technology provide conditional automation systems and methods that improve transportation and in particular, improve customer convenience and satisfaction in the context of autonomous vehicle ride hailing and ride sharing services.

Conditional automation systems can be implemented as an AV platform and realized as network-based services that bind certain pre-defined inputs to output events or notifications. Such services can automate or trigger the delivery of services (e.g., AV ride hailing dispatch or other services), and/or notifications based on pre-defined criteria, for example, that are logically structured in an if-this, then-that relationship. By way of example, upon the validated occurrence of an acceptable pre-condition, system outputs may initiate an AV ride hailing pick-up service, or make automatic route changes for an ongoing AV ride service.

To facilitate conditional automation in relation to autonomous vehicle (AV) behaviors, aspects of the disclosed technology provide a conditional AV platform that can be configured to receive or collect various inputs/triggers and to map those triggers onto pre-defined output signals. Details regarding the implementation of a conditional AV platform are further provided in discussion of FIG. 1.

Figure 1:
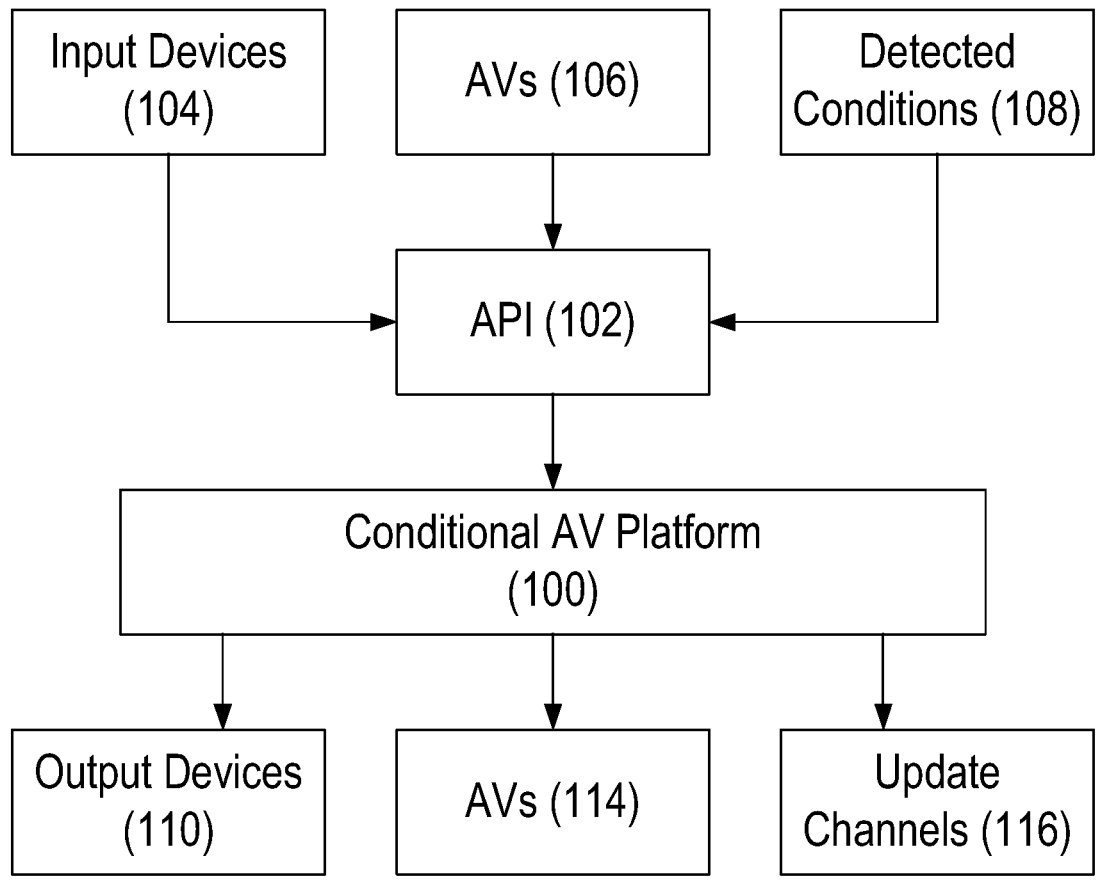
FIG. 1 illustrates a block diagram of a conditional autonomous vehicle (AV) platform, according to some aspects of the disclosed technology.

Specifically, FIG. 1 conceptually illustrates a block diagram of a conditional autonomous vehicle (AV) platform 100, according to some aspects of the disclosed technology. Depending on the desired application, AV platform 100 may be implemented using a variety of hardware and/or software (virtual) systems that can be instantiated as disparate network processes, for example, that are executed in a cloud computing environment. In practice, AV platform 100 is configured to receive inputs from a variety of sources, and to map the inputs onto conditional output signals configured to cause a predetermined effect.

Depending on the desired implementation, mappings between input signals (or "triggers") and outputs can be user defined or user selected. By way of example, a menu of user selectable conditional mappings may be provided to the user via an app on the user's mobile device. In such approaches, selectable options may be configured to communicate trigger/output pairings that are available to the user. By way of example, trigger/output pairings may include a calendar events/AV dispatch requests, such that calendar integration with the user's calendar enables the automatic dispatch of AV services upon the occurrence of certain pre-specified events. For example, such trigger/output pairings could be used to provide the user with transportation for a specific class of scheduled engagements, such as, "work meetings," "restaurant outings," or "travel" e.g., to provide airport pickup, etc.

In some implementations, trigger/output mappings may be user created. For example, a user may specify a pre-condition or event (trigger) that is to be associated with a particular response/output. Irrespective of whether the trigger/output mappings are selected or user created, the mappings may be stored/managed a remote system, such as, conditional AV platform 100 and/or on a mobile device of the user. In some instances, trigger/output mappings may be managed on the user's mobile device and uploaded (e.g., backed-up) to conditional AV platform 100 whenever network connectivity is available to the user. In this manner, conditional event mappings can be maintained and implemented even when the user device is without network connectivity.

In the example of FIG. 1, input signals (triggers) can be received from any of input devices 104, AVs 106, and/or conditions 108. Input devices 104 can refer to any third-party devices or applications configured to connect with and provide inputs to, AV platform 100, for example, via an Application Programming Interface (API) 102. By way of non-limiting example, input devices 104 can include smart home devices (e.g., smart-alarms, thermostats, and/or virtual assistant devices, etc.) and/or applications (e.g., email, calendars, and/or other communication tools, etc.), that can be configured used to provide actionable triggers to conditional AV platform 100. It is understood that other physical and/or virtual devices, such as mobile apps, may be configured to provide inputs to AV platform 100 and thus constitute one or more devices 104 as used herein, without departing from the scope of the disclosed technology.

Additionally, AVs 106 can refer to input triggers to AV platform 100 that are sourced from any of one or more AVs, for example, in an AV fleet that provides ride service to a user of AV platform 100. In some aspects, AVs 106 can include a specific vehicle/s associated with a user/rider through a service agreement. For example, an AV 106 responding to a user's ride request may provide inputs/triggers to AV platform 100 that can be used to generated conditioned outputs. By way of example, a responsive AV 106 may provide a trigger to conditional AV platform 100 once it is within a pre-determined distance (e.g., a geofence) from a pick-up location associated with the user/rider. In such an example, the trigger may cause AV platform 100 to send a message updating a restaurant reservation system with the user/rider's new estimated arrival time.

Detected conditions 108 can include any of a variety of information and/or data that can be received (or retrieved by) conditional platform 100. Detected conditions can include map data, weather data, traffic data, news data, and the like. Detected conditions 108 may also include data streams from various third-party sensors that indicate conditions about roadways, airports, and/or sporting events, etc. By way of example, AV platform 100 may receive one or more detected conditions 108 that relate to wait times at a particular restaurant. If the wait time exceeds a predetermined duration (e.g., 20 min., or 45 min.) then AV platform 100 may create a notification to recommend an alternate restaurant to a user of the platform 100.

In another example, detected conditions may relate to a state of one or more home appliances of the user/rider. For example, if an AV transporting the rider is detected to be leaving the user's home, then AV platform may detect an on/off state of the user's home heating ventilation and air conditioning (HVAC) system, for example, to determine if the system should be shut down while the user is away from the premises.

Conditional AV platform 100 receives inputs/triggers (e.g., from input devices 104, AVs 106, and/or detected conditions 108), and maps the inputs into output signals. Depending on the desired implementation, associations between inputs (triggers), and outputs generated by platform 100 can be provided as user selectable settings (e.g., as part of a ride hailing app), or may be user configurable. For example, a user may be able to select an option that binds an input (e.g., an AV arrival at their home), with an output (e.g., the generation of a text message to family members indicating that the user has arrived at her home). To facilitate receiving event triggers, the AV platform 100 may periodically determine whether conditions for one or more stored event triggers are met. In certain embodiments, the AV platform 100 may establish the transmission of the event trigger via an event listener after the trigger/output mapping is created, based on the mapped trigger. In other embodiments, the AV platform 100 merely receives data indicative of the condition for the trigger being met.

In the example of FIG. 1, provided inputs (e.g., from any of input devices 104, AVs 106, and/or detected conditions 108) can be mapped onto output devices 110, AVs 114 and/or updates 116. As used herein, output devices 110 can include any network connected devices, including but not limited to: smart phones, smart appliances (e.g., lights, locks, thermostats, etc.), or virtually any network connected device/s capable of exchanging data with AV platform 100. AVs 114 can include any autonomous vehicle (AV) or portion of an AV fleet that can receive and implement outputs received from AV platform 100. By way of example, in response to outputs from AV platform 100, AVs 114 may make route changes (e.g., modifications to pick-up or drop-off locations), changes to in-cabin environmental factors (e.g., by adjusting temperature, lighting, and/or music, etc.), and/or by modifying a driving style of the associated AV. As used herein, update channels 116 includes various communication channels that can be configured to receive information updates; such communication channels can include, but are not limited to: email, short messaging service (SMS), and/or social media accounts, etc. As understood by those of skill in the art, interaction between AV platform 100 and any of output devices 110, AVs 114 and/or update channels 116 can be mediated by an API, particularly for interfaces between AV platform 100 and third-party systems or devices.

Figure 2:
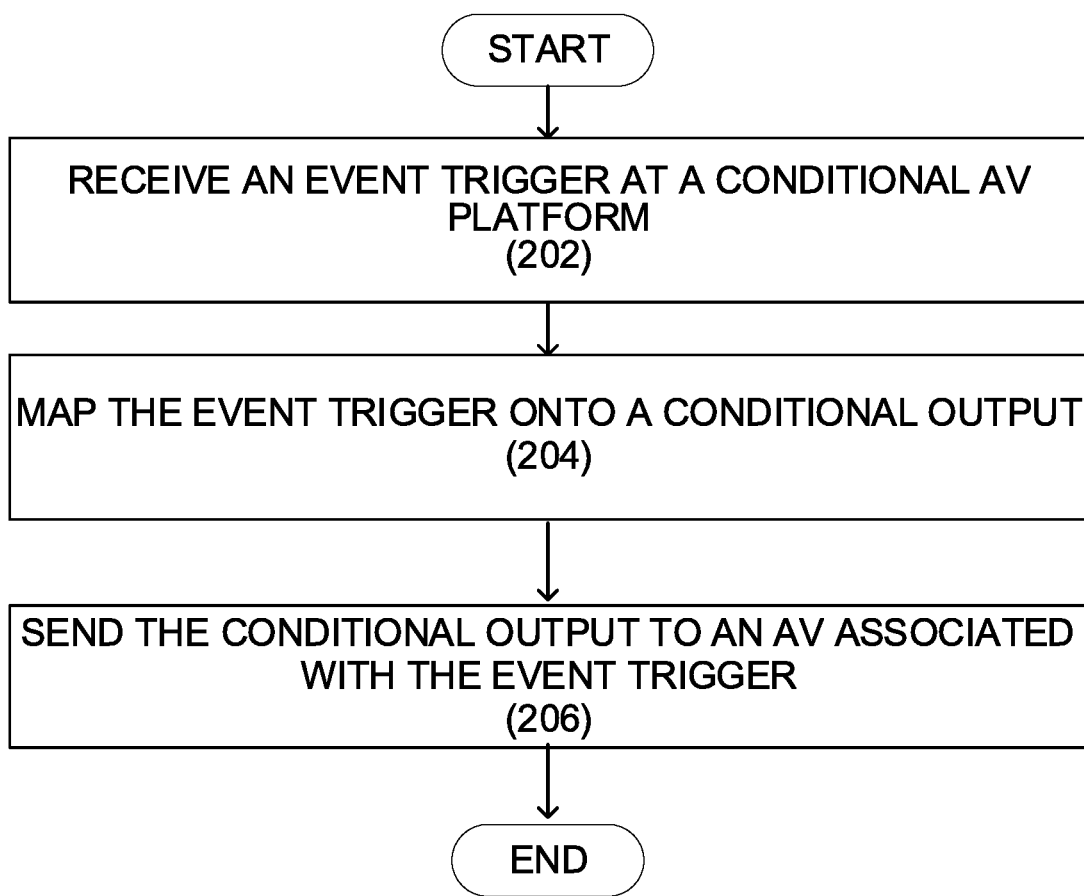
FIG. 2 illustrates steps of an example process for providing conditional outputs to an autonomous vehicle, according to some aspects of the disclosed technology.

FIG. 2 illustrates steps of an example process 200 for providing conditional outputs to an autonomous vehicle, according to some aspects of the disclosed technology. Process 200 begins with step 202 in which an event trigger is received at a conditional AV platform. As discussed above, the even trigger may originate an any of a variety of network connected devices or applications. Further to the example provided with respect to FIG. 1, event triggers can be created and transmitted by one or more input devices 114, AVs 106, and/or detected conditions 108. In some aspects, event triggers can be user defined. For example, a user of a ride hailing service may select triggers that can be used to generate conditional outputs by a conditional AV platform, such as platform 100, discussed above.

In step 204, the event trigger is mapped onto a conditional output e.g., by a conditional AV platform that maintains a mapping between user-defined triggers/outputs. In some aspects, associations between triggers and outputs may be provided as user selectable options. In other aspects, such associations may be user definable. By way of example, the AV platform may be configured to maintain a database of such associations that can be published by individual users for access by other users of the same ride hailing service.

In step 206, the conditional output is sent to an AV associated with the event trigger. It is understood that additional (or different) devices may receive the conditional output, such as output devices 110 and/or update channels 116, as discussed above. In the example of process 200, the conditional output is configured to implement a change in the receiving AV. By way of example, the conditional output may update an AV pick-up or drop-off destination. Additionally, the conditional output may be configured to implement changes to in-cabin environmental conditions, such as temperature, lighting, and/or music, etc.

Figure 3:
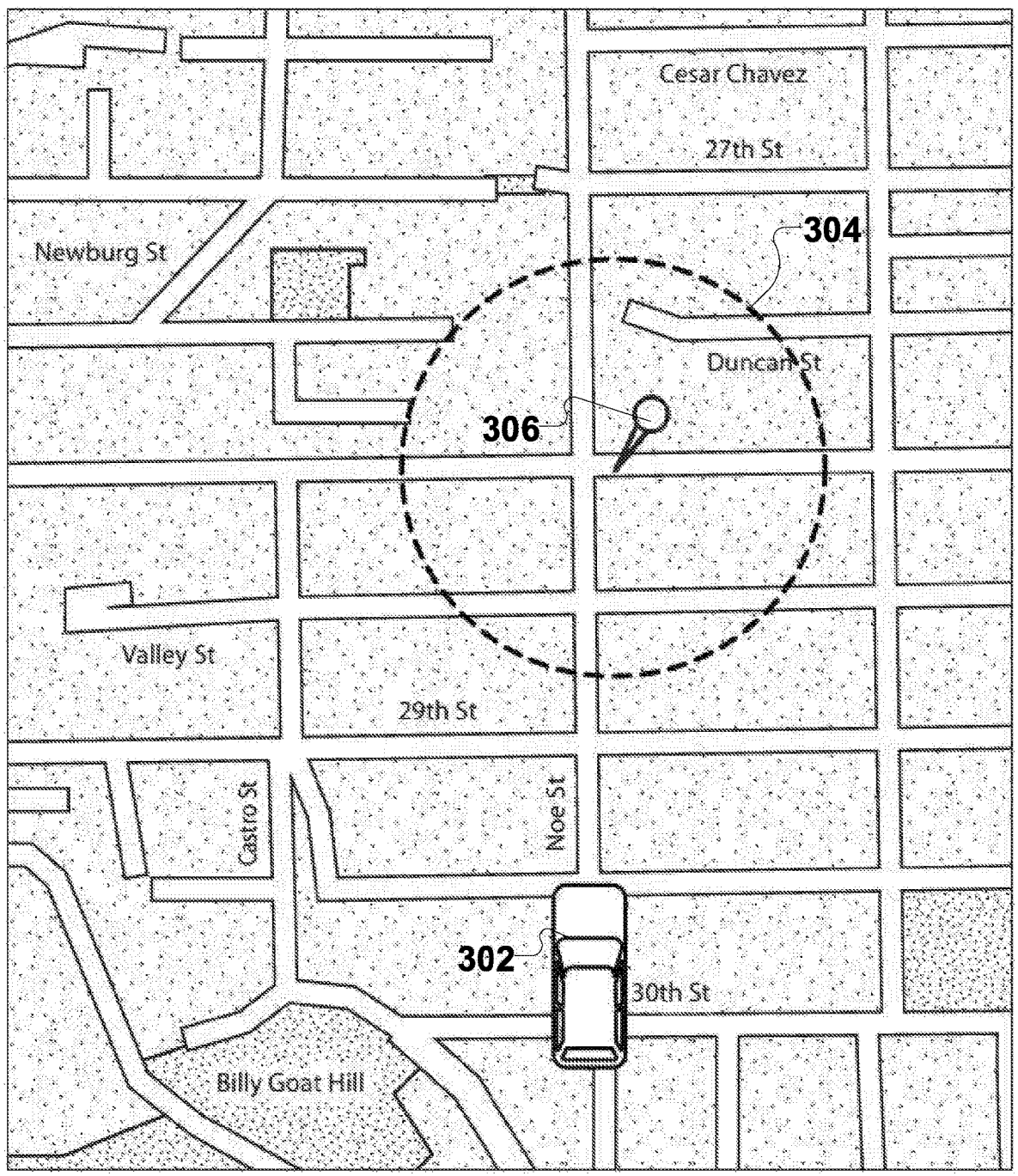
FIG. 3 conceptually illustrates an example environment in which some aspects of the disclosed technology may be implemented.

FIG. 3 conceptually illustrates a top-down view of a map 300 representing conditions under which some aspects of the disclosed technology can be implemented. Specifically, environment 300 illustrates an AV 302 approaching a destination location 306 encompassed by geo-fence 304. In this example, detected arrival of AV 302 at (or beyond) geo-fence 304 can provide a trigger to a conditional AV system (e.g., conditional AV system discussed above). Depending on the mapping between the trigger and the output different response signals may be generated by the conditional AV system. By way of example, upon detecting approach of AV 302 to pick-up location 306 (e.g., based on geo-fence 304), the conditional AV system may generate a notification to one or more family members of the user/rider, for example, to indicate that he/she is departing from the pick-up location. In another example, upon detecting approach of AV 302, the conditional AV system may generate a signal that is sent to a home automation system of the user/rider, for example, to turn on lights, or home temperature controls, etc. It is understood that virtually any number of other output signals may be generated by the conditional AV system in response to the same inputs, without departing from the scope of the disclosed technology.

Figure 4:
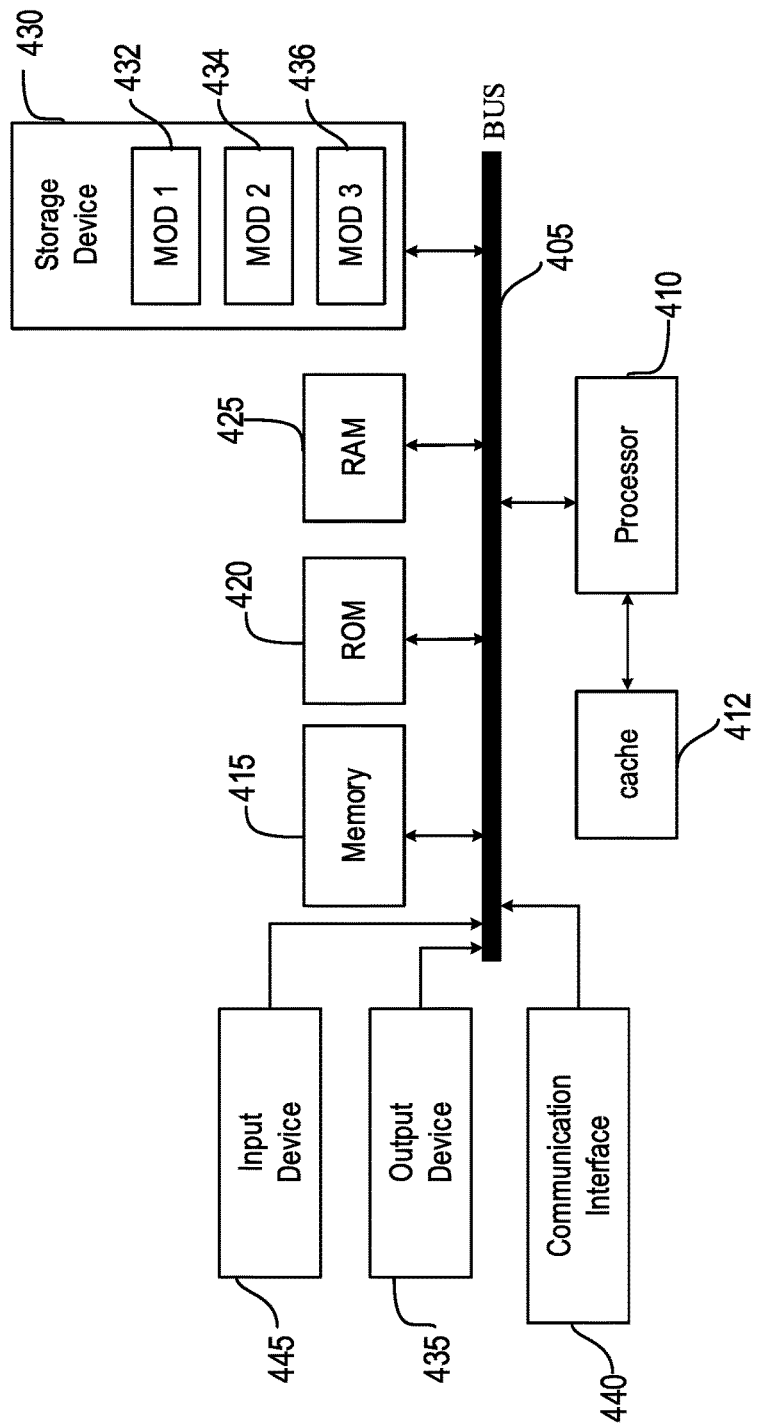
FIG. 4 illustrates an example processor-based system with which some aspects of the disclosed technology can be implemented.

FIG. 4 illustrates an example processor-based system with which some aspects of the subject technology can be implemented. Specifically, FIG. 4 illustrates system architecture 400 wherein the components of the system are in electrical communication with each other using a bus 405. System architecture 400 can include a processing unit (CPU or processor) 410, as well as a cache 412, that are variously coupled to system bus 405. Bus 405 connects various system components including a non-transitory computer-readable storage medium 415, (e.g., read only memory (ROM) 420 and random-access memory (RAM) 425, to processor 410.

System architecture 400 can include a cache of high-speed memory connected directly with, in close proximity to, or integrated as part of the processor 410. System architecture 400 can copy data from the memory 415 and/or the storage device 430 to the cache 412 for quick access by the processor 410. In this way, the cache can provide a performance boost that avoids processor 410 delays while waiting for data. These and other modules can control or be configured to control the processor 410 to perform various actions. Other system memory 415 may be available for use as well. Memory 415 can include multiple different types of memory with different performance characteristics. Processor 410 can include any general purpose processor and a hardware module or software module, such as module 1 (432), module 2 (434), and module 3 (436) stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction with the computing system architecture 400, an input device 445 can represent any number of input mechanisms, such as a microphone for speech, a touch-sensitive screen for gesture or graphical input, keyboard, mouse, motion input, speech and so forth. An output device 435 can also be one or more of a number of output mechanisms. In some instances, multimodal systems can enable a user to provide multiple types of input to communicate with the computing system architecture 400. Communications interface 440 can generally govern and manage the user input and system output. There is no restriction on operating on any particular hardware arrangement and therefore the basic features here may easily be substituted for improved hardware or firmware arrangements as they are developed.

Storage device 430 is a non-volatile memory and can be a hard disk or other types of computer readable media which can store data that are accessible by a computer, such as magnetic cassettes, flash memory cards, solid state memory devices, digital versatile disks, cartridges, random access memories (RAMS) 425, read only memory (ROM) 420, and hybrids thereof.

Storage device 430 can include software modules 432, 434, 436, for controlling processor 410. Other hardware or software modules are contemplated. Storage device 430 can be connected to the system bus 405. In one aspect, a hardware module that performs a particular function can include the software component stored in a computer-readable medium in connection with the necessary hardware components, such as the processor 410, bus 405, output device 435, and so forth, to carry out various functions of the disclosed technology.

By way of example, instruction stored on computer-readable media can be configured to cause one or more processors to perform operations including: receiving a ride request, at a computing system of an autonomous vehicle (AV), wherein the ride request specifies a pick-up location associated with a user; navigating the AV to the pick-up location to provide ride service for the user; receiving in-cabin sensor data associated with the user, wherein the in-cabin sensor data is collected along a route corresponding with the ride service provided for the user; analyzing the in-cabin sensor data to determine a sentiment score associated with the ride service; receiving a ride quality index for the ride service; and correlating the sentiment score with the ride quality index for the ride service.

In some aspects, the processors can be further configured to perform operations for correlating the sentiment score with a ride service review provided by the user. In some aspects, the processors can be further configured to perform operations for providing the sentiment score and the ride quality index to a machine-learning algorithm; and determining, using the machine-learning algorithm, a causal relationship between the ride quality index for the ride service and the sentiment score associated with the ride service.

In some aspects, the processors can be further configured to perform operations for determining a satisfaction of the user for the ride service based on the sentiment score associated with the ride service. In some aspects, the processors can be further configured to perform operations for adjusting a driving profile of the AV based on the sentiment score associated with the ride service.

In some aspects, the processors can be further configured to perform operations for adjusting a driving profile of the AV based on the sentiment score associated with the ride service. In some aspects, the processors can be further configured to perform operations for updating a driving profile associated with the user based on the sentiment score associated with the ride service.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method, comprising:
   receiving an event trigger at a conditional autonomous vehicle (AV) platform, wherein the event trigger comprises an indication that an AV associated with the event trigger is within a pre-determined distance to a pick-up location;
   mapping the event trigger to a conditional output; and
   sending the conditional output to the AV, wherein the conditional output is configured to trigger the AV platform to automatically send, to a system associated with a destination location, a message including an estimated time of arrival of the AV to the destination location.

2. The computer-implemented method of claim 1, wherein the event trigger further comprises a roadway condition information, wherein the conditional output is configured to update a navigation instruction followed by the AV, and wherein the navigation instruction comprises a change to a route associated with the AV and one or more of: a pick-up location, a drop-off location, or a way-point.

3. The computer-implemented method of claim 1, wherein the conditional output is further configured to update one or more environmental controls in a cabin of the AV.

4. The computer-implemented method of claim 1, wherein the conditional output is further configured to update a driving profile of the AV.

5. The computer-implemented method of claim 1, wherein the event trigger comprises a wait time associated with the destination location, and wherein the conditional output is configured to trigger the AV platform to automatically create a notification recommending a different destination location based on a determination that the wait time exceeds a predetermined duration.

6. The computer-implemented method of claim 1, wherein the event trigger is based on a detected location change of a mobile device with respect to a predetermined geofence.

7. The computer-implemented method of claim 1, wherein the event trigger is based on a calendar entry for a user of an AV ride hailing service.

8. A system comprising:
   one or more processors; and
   a computer-readable medium comprising instructions stored therein, which when executed by the one or more processors, cause the one or more processors to perform operations comprising:
   receiving an event trigger at a conditional autonomous vehicle (AV) platform, wherein the event trigger comprises an indication that an AV associated with the event trigger is within a pre-determined distance to a pick-up location;
   mapping the event trigger to a conditional output; and
   sending the conditional output to the AV, wherein the conditional output is configured to trigger the AV platform to automatically send, to a system associated with a destination location, a message including an estimated time of arrival of the AV to the destination location.

9. The system of claim 8, wherein the event trigger further comprises a roadway condition information, wherein the conditional output is configured to update a navigation instruction followed by the AV, and wherein the navigation instruction comprises a change to a route associated with the AV and one or more of: a pick-up location, a drop-off location, or a way-point.

10. The system of claim 8, wherein the conditional output is further configured to update one or more environmental controls in a cabin of the AV.

11. The system of claim 8, wherein the conditional output is further configured to update a driving profile of the AV.

12. The system of claim 8, wherein the event trigger comprises a wait time associated with the destination location, and wherein the conditional output is configured to trigger the AV platform to automatically create a notification recommending a different destination location based on a determination that the wait time exceeds a predetermined duration.

13. The system of claim 8, wherein the event trigger is based on a detected location change of a mobile device with respect to a predetermined geo-fence.

14. The system of claim 8, wherein the event trigger is based on a calendar entry for a user of an AV ride hailing service.

15. A non-transitory computer-readable storage medium comprising instructions stored therein, which when executed by one or more processors, cause the processors to perform operations comprising:
  receiving an event trigger at a conditional autonomous vehicle (AV) platform, wherein the event trigger comprises an indication that an AV associated with the event trigger is within a pre-determined distance to a pick-up location;
  mapping the event trigger to a conditional output; and
  sending the conditional output to the AV, wherein the conditional output is configured to trigger the AV platform to automatically send, to a system associated with a destination location, a message including an estimated time of arrival of the AV to the destination location.

16. The non-transitory computer-readable storage medium of claim 15, wherein the event trigger further comprises a roadway condition information, wherein the conditional output is configured to update a navigation instruction followed by the AV, and wherein the navigation instruction comprises a change to a route associated with the AV and one or more of: a pick-up location, a drop-off location, or a way-point.

17. The non-transitory computer-readable storage medium of claim 15, wherein the conditional output is further configured to update one or more environmental controls in a cabin of the AV.

18. The non-transitory computer-readable storage medium of claim 15, wherein the conditional output is further configured to update a driving profile of the AV.

19. The non-transitory computer-readable storage medium of claim 15, wherein the event trigger comprises a wait time associated with the destination location, and wherein the conditional output is configured to trigger the AV platform to automatically create a notification recommending a different destination location based on a determination that the wait time exceeds a predetermined duration.

20. The non-transitory computer-readable storage medium of claim 15, wherein the event trigger is based on a detected location change of a mobile device with respect to a predetermined geo-fence.

* * * * *